Aug. 12, 1969   R. TUCK   3,460,761
ROBOT IRRIGATOR
Filed March 23, 1967   3 Sheets-Sheet 1

INVENTOR.
RALPH TUCK
BY William R. Piper
ATTORNEY

United States Patent Office 3,460,761
Patented Aug. 12, 1969

3,460,761
ROBOT IRRIGATOR
Ralph Tuck, P.O. Box 1046, Missoula, Mont. 59801
Filed Mar. 23, 1967, Ser. No. 625,357
Int. Cl. B05b 3/14, 9/06; B62d 11/04
U.S. Cl. 239—179
6 Claims

ABSTRACT OF THE DISCLOSURE

The robot irrigator has an automatic steering mechanism for causing the machine to follow a ditch filled with water. The machine will suck up water from the ditch and propel the water through a nozzle that swings in an arc to throw the water on both sides of the machine and to the rear as the machine travels along the ditch. The swinging of the water nozzle can be controlled to oscillate the nozzle in an arc up to about 180° and to water any portion of this arc. The machine will automatically stop at the end of the ditch.

BACKGROUND OF THE INVENTION

The robot irrigator is to be used in irrigating land that has ditches in it that can be filled with water. These water-filled ditches may parallel each other and be spaced as much as two hundred feet apart. It is possible to have the ditch in the form of a large spiral. The robot irrigator will follow the ditch whether it is straight or curved and will receive its water from the water-filled ditch and will force the water through the oscillating nozzle. It is possible to spray water on either or both sides of the ditch.

SUMMARY OF THE INVENTION

An object of my invention is to provide a robot irrigator that has independently driven drive wheels mounted on each side of the machine. Novel steering means is used that will move along the ditch filled with water and cause both drive wheels to rotate at speeds independent of each other for causing the machine to follow along the ditch regardless of whether it extends in a straight line or has curves in it.

A further object of my invention is to provide a robot irrigator with a water nozzle that can swing through an arc of 180° or less. The speed of oscillation of the water nozzle can be controlled. The nozzle can be elevated to different angles and novel means is provided to change the angle of inclination continuously to follow a definite pattern as the nozzle is oscillated transversely through a predetermined arc.

The robot irrigator functions without an operator. Suitable engine stopping means is provided at the end of the ditch to bring the machine to a stop at this point.

A further object of my invention is to provide a robot irrigator that carries a flexible dam designed to be dragged along the ditch at the rear of the machine. This moving dam will back up the water in the ditch behind the machine for assuring a proper water level in which the suction hose can be immersed for withdrawing water and delivering it to a water pump, the latter forcing the water out through the oscillating nozzle.

BRIEF DESCRIPTION OF THE DRAWINGS

FIGURE 4 is an enlarged isometric view of part of the hydraulic system used for oscillating the irrigating nozzle.

FIGURE 5 is an enlarged isometric view of one of the two clutch-actuating arms for operatively connecting one of the drive wheels to its associate driving mechanism or for disconnecting it therefrom.

DESCRIPTION OF THE PREFERRED EMBODIMENT

Figure 1:
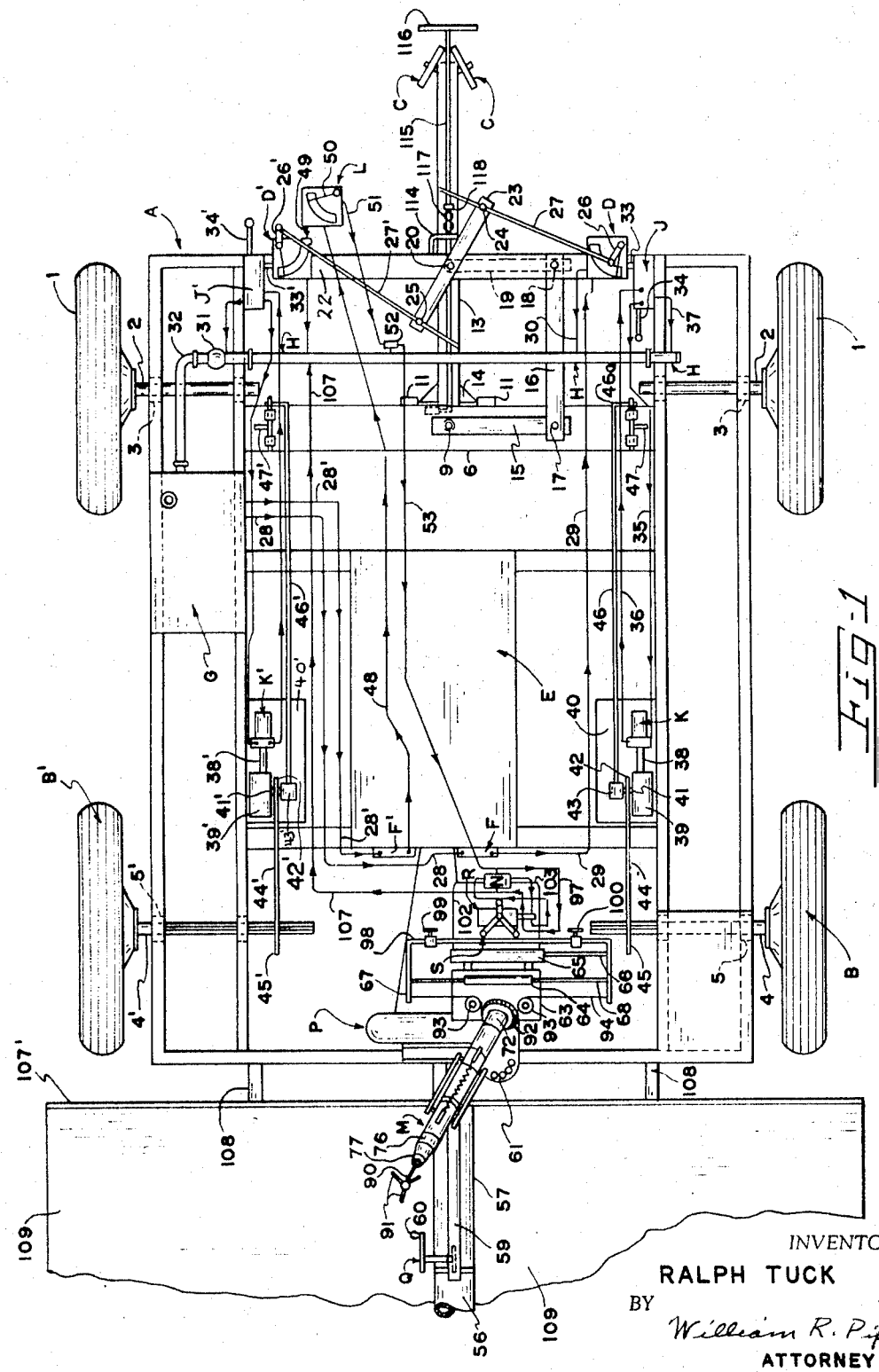
FIGURE 1 is a schematic plan view of the robot irrigator.

In carrying out my invention, I provide a wheeled vehicle shown schematically in FIGURE 1. The vehicle frame is indicated generally at A, in FIGURE 1, and it is supported by front wheels 1—1, a right rear drive wheel B, and a left rear drive wheel B'. The front wheels 1—1 are mounted on short front axles 2—2 and the latter are supported in bearings 3 that in turn are connected to the rectangular vehicle frame A. The short front axles 2 may be adjusted laterally with respect to the sides of the frame A so as to dispose the two front wheels the desired distance apart to straddle a ditch containing water. The rear drive wheels B and B' are rotatably mounted in rear bearings 5 which in turn are connected to the main frame A. The rear axles 4—4' may be adjusted laterally for positioning the rear drive wheels B and B' the desired distance from the sides of the rectangular frame A.

Figure 2:
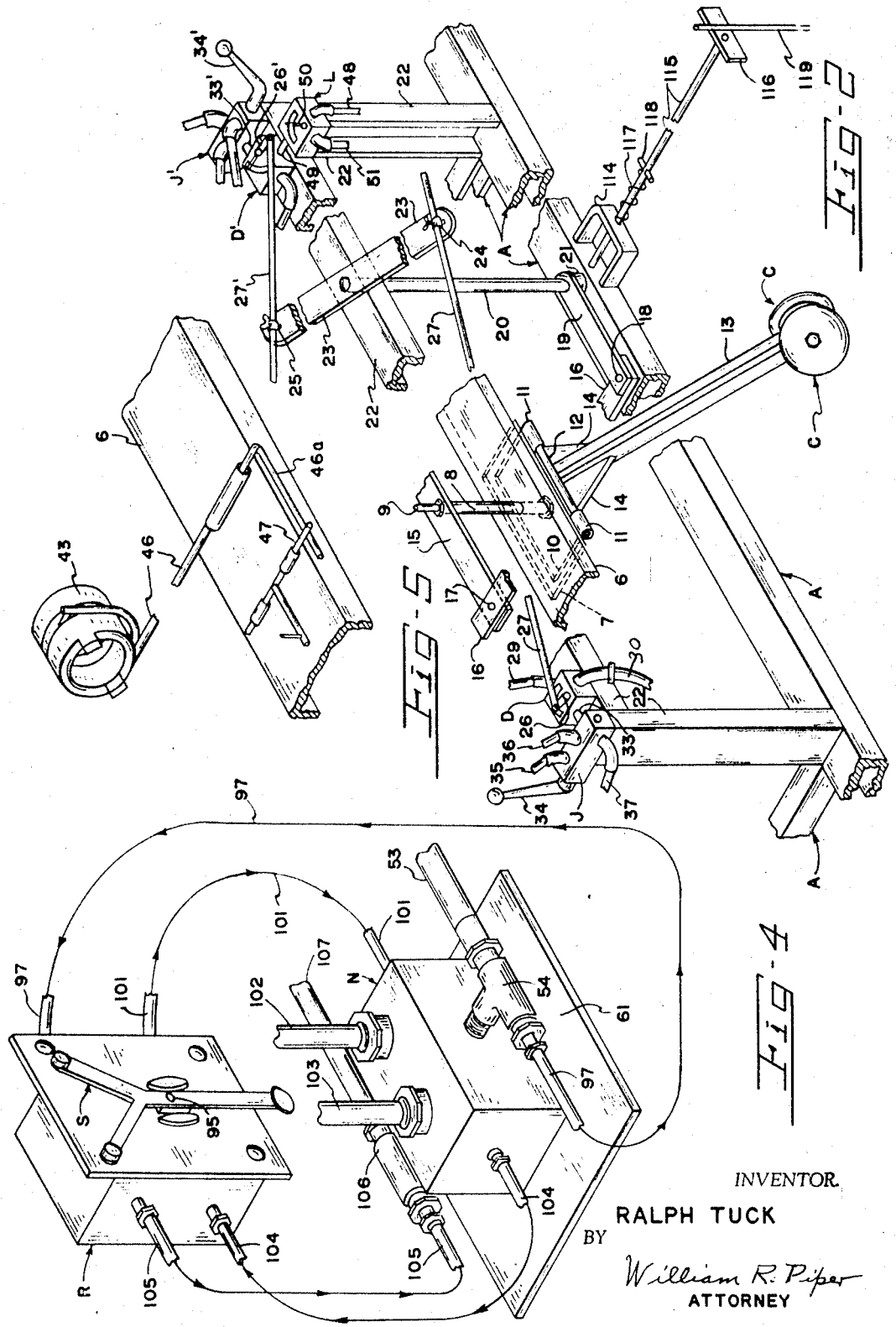
FIGURE 2 is an isometric view of the guide wheels and part of the associate mechanism for steering the machine.

Before describing how the rear drive wheels B and B' are rotated independently of each other so as to steer the machine to follow the course of the ditch, I will first describe the automatic guide wheel mechanism which causes the rear drive wheels to steer the robot irrigator. In FIGURES 1 and 2, I show a cross member 6 that is channel-shaped in cross section and is disposed near to the front of the main frame A. The channel member has its ends connected to the main frame and FIGURE 2 shows the center of the channel member 6 supporting a bearing plate 7 which is secured thereto. To the cross member 6 there is welded a heavy duty pipe 8 which serves as a bushing for a large bolt and nut 9. The bolt 9 has its lower end rigidly connected to a hinge plate 10 that in turn bears against the underside of the bearing plate 7 and can rotate with respect thereto, this rotation causing the vertical bolt to rotate within the pipe 8.

The front edge of the hinge plate 10 has bearings 11—11 for rockably receiving a rod 12, see FIGURE 2. An arm 13 has one end welded to the rod 12 and the arm extends at right angles to the rod axis. Two gussets 14 are welded to the arm or guide tongue 13 and rod 12 for reenforcing the arm. I mount two guide wheels C at the free end of the arm 13 and these are inclined toward each other as shown in FIGURE 1. When these guide wheels move from the center line of the ditch they will swing the arm 13 back toward the center of the ditch. This motion of the arm will rotate the hinge plate 10 with it and will rotate the bolt 9 in the pipe bearing 8.

I will now describe how the moving of the arm or guide tongue 13 will steer the robot irrigator so that it will follow the direction of the ditch. In FIGURES 1 and 2, I show an arm 15 with one end connected to the top of the bolt 9 so as to be swung through an arc when the bolt is rotated. A link 16 has one end pivotally connected at 17 to the outer end of the arm 15. The link 16 extends forwardly and has its free end pivotally connected at 18 to the free end of an arm 19. The opposite end of the arm 19 is welded to a vertically extending rod 20. The lower end of the rod 20 rotates in a sleeve 21 that is welded to the frame A, see FIGURE 2.

The upper end of the rod 20 is rotatably mounted in a cross channel 22 whose ends are supported by the frame A. The channel 22 is disposed above the front end of the frame A, as is clearly shown in FIGURE 2. In actual construction the ends of the cross channel are mounted on uprights, also designated 22, whose lower ends are supported by the front end of the frame A. A lever 23 has its midpoint secured to the top of the vertical rod 20 so that when the rod 20 is rotated about its vertical axis, it will swing the lever 23 in a horizontal plane. FIGURE 1 shows the lever 23 making an angle of approximately 60° with the arm 19.

The swinging of the lever 23 actuates two control valves D and D' which are identical in construction. The control valve D is for operating the right rear drive wheel B while the control valve D' is for operating the left rear drive wheel B'. The hydraulic mechanism operatively connecting the control valve D to the right rear drive wheel B is identical to the hydraulic mechanism that operatively connects the control valve D' to the left rear drive wheel B'. Therefore a detailed description of the hydraulic mechanism operatively connecting the control valve D to the right rear drive wheel B will suffice to a great extent to include a description of the other hydraulic mechanism.

The outer ends of the lever 23 are provided with T-slips 24 and 25, see FIGURE 2, that are rotatably carried by the lever. The control valve D has a volume control handle 26 that has one end of a rod 27 pivotally connected to it and the other end of the rod is adjustably received in the T-slip 24 so that a rotation of the lever 23, caused by the guide wheels C striking a side of the ditch, will move the control handle 26 for a purpose described later. In like manner the other control valve D' has a volume control handle 26' that has one end of a rod 27' pivotally connected to it and the other end is adjustably received in the T-slip 25 so that the same rotation of the lever 23 will move the handle 26' for a purpose hereinafter described.

The description of the hydraulic mechanism for operating the right rear drive wheel B, will now be described. In FIGURE 1, I indicate an engine E, which may be of any type desired. In actual practice I am using a GM three-cylinder diesel engine. The engine operates an oil pump indicated schematically at F. A second oil pump F' is also operated by the engine E and actuates the left rear drive wheel B' in a manner hereinafter described. The oil pump F draws oil from an oil-containing tank G, through an oil conduit which is shown diagrammatically at 28 by a line with arrow heads indicating the direction of flow. Another oil conveying conduit is shown diagrammatically by an arrowed line 29 that leads from the oil pump F, to the control valve D. The oil control valve D that is used is manufactured by the Brand Hydraulics Company. When this valve D is in the "OFF" position, all of the oil delivered by the pump F, will be directed into a by-pass line 30, that connects with an oil-return manifold H. From here the oil will flow through a vacuum indicator and filter 31, and then a hose 32 conveys the oil back to the oil reserve tank G. The oil-return manifold H extends transversely across the entire machine as shown in FIGURE 1. It will return oil from all of the hydraulic systems back to the tank G. The vacuum indicator on the oil filter 31 will show the hydraulic oil flow.

The full range flow control valve D, supplies hydraulic oil to a directional control valve J, see FIGURE 1, through a pipe 33, that interconnects the two valves. The control handle 26 for the valve D must be in open position before oil will flow from the valve to the directional control valve J. I have already described how the control handle 26 is automatically actuated by the movement of the rod 27 which in turn is controlled by the swinging of the arm or tongue 13 as the guide wheels C strike the sides of the ditch.

The directional control valve J is of the one spool type. When a lever 34, mounted on the valve J, is moved into "FORWARD" position, oil will flow from the valve, through a conduit 35 to a hydraulic motor K for operating it. The oil will return back to the valve from the motor K by way of another conduit 36 and then a conduit 37 conveys the oil back to the oil-return manifold H. The motor K is manufactured by the Char-Lynn Company and it has a shaft 38 that enters a gear box 39. The motor and gear box are mounted on a platform 40, see FIGURE 1. Another shaft 41 extends from the gear box 39 and it has a free wheeling sprocket 42 mounted thereon. When this sprocket is engaged by a clutch 43, it will operate a chain 44 and sprocket 45, the latter being keyed to the axle 4 for the right rear wheel B. The wheel B will be rotated to move the machine forwardly along the ditch.

A clutch-actuating arm 46 is indicated diagrammatically in FIGURES 1 and 5 and extends forwardly from the clutch 43 shown in FIGURE 1, to the cross member 6 of the frame A. The arm 46 operates on a wrist motion and when rotated in one direction it will throw the clutch "IN" to actuate the rear drive wheel B, and when rotated in the opposite direction it will throw the clutch "OUT" or disengage the clutch. The arm 46 is rocked into the desired position by a handle 46a and is held in place by a locking bolt pin 47, see FIGURE 5.

When reversing the rotation of the right rear drive wheel B, the lever 34 for the directional control valve J is moved rearwardly into "REVERSE" position and this will reverse the flow of oil in the conduits 35 and 36 from that indicated in FIGURE 1 by the arrow heads, and will reverse the rotation of the hydraulic motor K. The wheel B will be reversed and will move the machine rearwardly.

"NEUTRAL" position for the lever 34 is between "FORWARD" and "REVERSE" positions. The oil will flow from the directional control valve J, into the conduit 37 and flow back to the tank G by way of the oil-return manifold H. The forward or rearward rotation of the right rear drive wheel B, affects the movement of the right side of the machine. The speed of rotation of the wheel B depends upon the quantity of fluid delivered to the directional control valve J by the pipe 33 from the control valve D. This quantity control of the fluid is accomplished automatically by the rod 27 acting on the control handle 26 and the movement of the rod is controlled by the swinging of the arm or guide tongue 13 as the guide wheels C move out of a 90° angle with respect to the front of the frame. The initial speed of the machine is set by manually adjusting the control handle 26 for the control valve D to determine the quantity of fluid delievered to the directional control valve J by the pipe 33. Any excess fluid is returned to the oil-return manifold H by the by-pass line 30, see FIGURE 1.

The automatic steering of the machine is accomplished by a duplicate hydraulic system that operatively connects the control valve D' with the left rear drive wheel B', and since this hydraulic system is a duplicate of the one operatively connecting the control valve D with the right rear drive wheel B, similar parts between the two systems will be given like reference letters and numerals except that they will be primed and further description need not be given. Suffice it to say that the functioning of the left rear drive wheel B' will be explained in the operation of the entire machine in order to describe how the machine is automatically steered so as to follow the contour of the ditch without the need of an operator on the machine.

It should be noted however, that the oil pump F', that draws oil from the tank G, by the conduit 28', first delivers oil to a control valve L that is similar to the control valves D and D', and a conduit 48 connects the pump with the valve L, see FIGURE 1. The control valve L is for operating the hydraulic mechanism that controls the swinging of a water nozzle M in a manner presently to be described. Oil under pressure can also flow from the full flow control valve L to the control valve D' through a pipe 49, see also FIGURE 2. The valve D' communicates with the directional control valve J' by the pipe 33'. The latter valve J' has its control lever 34' that controls the forward and rearward rotation of the left rear drive wheel B' and also can cause the wheel to stand still when the lever is in "NEUTRAL" position.

The hydraulic apparatus for swinging the water nozzle M, is shown schematically in FIGURE 1, and is shown Since both the valve mechanism N and the pilot valve R with its lever S are manufactured by the same company and it is well known how the two valve mechanisms N and R are to be hydraulically connected in order to reciprocate the piston rod 66 in the hydraulic cylinder 65, a detailed description of the operation of these two valves need not be given. Suffice it to say that the hydraulic line 97 communicates with the valve R, see the schematic view of FIGURE 1, and another line 101 leads from the valve R back to the valve N. Two other hydraulic lines 102 and 103 lead from the valve N and communicate with opposite ends of the cylinder 65 for reciprocating the piston rod 66. Also two other hydraulic lines communicate with the valve R. One line 104 leads from the valve R to the valve N, and the other line 105 leads from the valve R to a T 106 that communicates with the valve mechanism in the valve N, see FIGURE 4. Another conduit 107 leads from the T 106 to the oil return manifold H, see FIGURE 1.

When the operator actuates the lever 50 for the control valve L, in FIGURE 1, fluid will flow from the valve through the conduits 51 and 53 to the valve mechanism in the valve N and also will flow through the conduit 97 to the valve R. These valves cooperate to reciprocate the piston rod 66 and the length of the stroke is determined by the positions of the adjustable stops 99 and 100 on the front bar 98. The stops 99 and 100 can also be adjusted to cause the water nozzle M to swing through any desired portion of an arc of 180° or through the entire arc. The speed of oscillation of the water nozzle M depends upon the extent of opening of the control valve L which controls the volume of fluid flowing to the nozzle oscillating hydraulically actuated mechanism.

At the rear of the frame A, I mount a transversely extending rod 107', see the schematic plan view of FIGURE 1. The rod is secured to the frame by brackets 108 or other suitable fastening means. The rod 107' extends from side to side of the frame A and supports the front edge of a flexible rubber dam 109 that extends down into the ditch, not shown, along which the robot irrigator is travelling, for the purpose of acting as a travelling dam. The dam 109 slides along the bottom of the water-filled ditch. The water in the ditch backs up against the dam during the travelling of the machine along the ditch and causes a sufficient depth of water in the ditch to keep submerged the entrance end of the suction hose 56. A full supply of water to the pump P, is thus assured.

Figure 3:
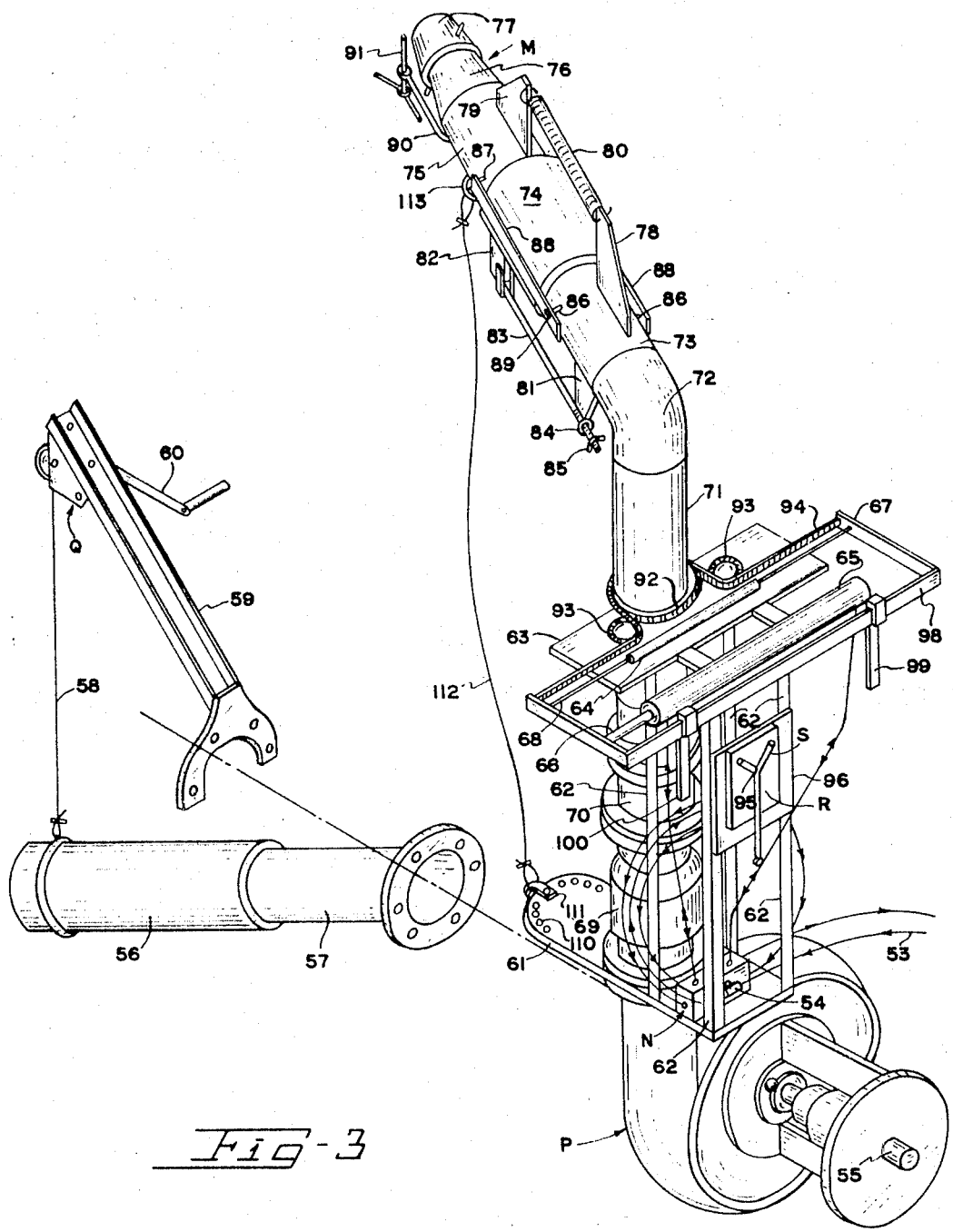
FIGURE 3 is an enlarged exploded isometric view of the machine for sucking water from the irrigating ditch and for delivering it to an oscillating nozzle.

In FIGURE 3, I show the plate 61 provided with a plurality of openings 110, arranged in the form of an arc. A clevis 111 is connected to the desired opening and a cable 112 has one end connected to the clevis and its other end is connected to a ring 113 mounted on the pipe 75 of the water nozzle or gun assembly M. The length of the cable 112 can be varied to hold the water nozzle M at the desired angle to a horizontal plane. For example if a strong wind is blowing in the direction in wihch the machine is travelling, the operator would want the water Nozzle M at a less angle to the horizontal plane because the water stream would be projected a greater distance against the wind than if the nozzle were inclined upwardly at a greater angle. The cable will hold the water nozzle at the desired angle while still permitting the nozzle to be oscillated.

In actual practice the water pump P that is being used is adapted to deliver one thousand one hundred gallons per minute. A water pressure of eighty pounds to the square inch is developed and eight hundred and twenty-three gallons of water per minute is delivered. I do not wish to be confined to these exact amounts because the size of the pump may be varied and therefore the water pressure and quantity of water delivered can be changed.

An automatic engine stopping mechanism is shown in FIGURES 1 and 2. The front transverse channel of the frame A, carries a U-shaped guide member 114 for slidably supporting a limit rod 115 that projects forwardly of the frame. The front end of the limit rod projects beyond the front guide wheels C and is provided with a stop plate 116. A coil spring 117 is mounted on the limit rod 115 and has one end bearing against the U-shaped guide 114 and its other end bearing against a transverse pin 118 carried by the rod.

A destination stake 119, see FIGURE 2, is driven into the ditch, not shown, where the operator wishes the machine to stop in its travelling. The stake 119 will be in the path of the stop plate 116 and when this plate strikes the stake, the limit rod 115 will be moved rearwardly a slight distance and compress the coil spring 117. The inner end of the limit rod, not shown, will actuate a limit switch, not shown, when the rod is moved rearwardly and the limit switch will ground out the ignition circuit to the engine E and stop it from operating. In this way the robot irrigator is brought to a stop.

OPERATION

From the foregoing description of the various parts of the device, the operation thereof will be readily apparent. The automatic hydraulic guiding system is one of the novel features of my invention. The levers 34 and 34' for the directional control valves J and J' are placed in neutral position and the control handle 50 for the valve L that actuates the water nozzle M is closed. The engine E is started and this will actuate the oil pumps F and F'. The stops 99 and 100 are adjusted on the front bar 98 of the reciprocable frame 67 for swinging the water nozzle M through an arc of 180° or any portion thereof. The levers 34 and 34' are moved into forward position and the handle 50 is adjusted to control the amount of fluid flowing to the hydraulic mechanism that controls the oscillation of the nozzle. The machine will now move forward along the length of the ditch and the water nozzle M will irrigate the desired area of land bordering the ditch.

The guide wheels C will keep the machine following the course of the ditch regardless of whether the ditch is straight or curved in its length. The quantity of fluid flow to the two hydraulic motors K and K' is automatically controlled by the swinging of the arm or guide tongue 13, and the swinging of the arms 26 and 26' on the fluid control valves D, and D', so that the relative rotations of the rear drive wheels B and B' will be independent of each other and will keep the machine following the course of the ditch automatically. No operator need follow the machine because it will stop automatically at the end of its course when the stop plate 116 strikes the stake 119 and stops the operation of the engine E.

I claim:
1. A robot irrigating machine comprising:
 (a) a frame adapted to straddle an irrigating ditch;
 (b) independent drive wheels, one being disposed on each side of the frame, the two drive wheels straddling the ditch;
 (c) a separate power unit operatively connected to each drive wheel;
 (d) a separate speed control means for each power unit for causing the drive wheel, operatively connected thereto, to rotate at varying speeds;
 (e) automatic steering means for said machine and including a member movable along the length of the ditch and swingable to the right or left by the sides of the ditch as the course of the ditch curves to the right or to the left;
 (f) means operatively connecting said member to both of said speed control means so that when said member is swung to the left by the course of the ditch curving to the left, the speed control means for the right drive wheel will accelerate the rotation thereof and the speed control means for the left drive wheel will decelerate the rotation thereof for causing said machine to turn to the left to continue following the course of the ditch; and when said member is swung to the right by the course of the ditch curving to the in enlarged detail in FIGURE 3. In FIGURES 1 and 2, the full flow control valve L is provided with a control handle 50 that regulates the quantity of fluid delivered to a conduit 51. The conduit 51 connects with a pressure control valve 52 which in turn is connected to the oil-return manifold H, see FIGURE 1, and has an oil line 53 that connects with a T 54, see the enlarged isometric detail in FIGURE 4, where the T 54 is shown connected to a hydraulically actuated valve N. The valve is manufactured by the Calkins Manufacturing Co., Spokane, Wash., but other types could be used.

Before describing the flow of oil to control the swinging of the water nozzle M, it is best first to describe how the nozzle is supported by the machine. FIGURES 1 and 3 show a water pump P that is operatively connected to the engine E. A pump shaft 55 is rotated by the engine. The pump P will draw water through a hose 56 and a pipe 57, the latter communicating with the water inlet for the pump. The hose 56 is flexible and is lowered into a ditch of water by a cable 58, see the exploded view of FIGURE 3, the cable having one end connected to the hose and its other end connected to a boat-type winch, indicated generally at Q. The winch in turn is carried by the outer end of a boom 59 and the other end of the boom is secured to the pump casing. A crank handle 60 can actuate the winch Q for raising or lowering the rubber hose 56. The pipe 57 and the boom 59 are shown separated from the pump in FIGURE 3.

The pump casing P, supports a lower plate 61, see FIGURE 3, which serves as a mount for the valve casing N. Four uprights 62 extend upwardly from the plate 61 and support an upper plate 63, which in turn has a guide pipe 64 secured thereto and a two-way hydraulic cylinder 65. A rod 66 extends from one end of the cylinder 65 and in turn has its ends connected to a reciprocable frame 67. A guide rod 68 is slidably received in the guide pipe 64 and the ends of the rod 68 are connected to the reciprocable frame 67.

The pump P receives water from the irrigation ditch by means of the hose 56 and pipe 57 and forces the water past a check valve indicated at 69, and a swivel joint shown at 70 in FIGURE 3. The swivel joint 70 connects with a pipe 71 that can be rotated through an arc of 180° or any portion thereof. The upper end of the pipe 71 communicates with an L 72 and a short pipe 73 extends from the L 72 and at an angle of about 40° to a horizontal plane. A rubber hose 74 is connected to the pipe 73, and in turn is connected to another short pipe 75. A reducer 76 communicates with the pipe 75 and has different sized water nozzles 77 that may be threaded into it.

In order to hold the pipe 75 and the hose 74 in place, I provide four gussets. The two upper gussets 78 and 79 are welded to the short pipes 73 and 75, respectively, and a high tension spring 80 is connected to these two gussets for absorbing all of the vibrations produced by the force of the water flowing through the nozzle 77. The two lower gussets 81 and 82 are welded to the same two pipes 73 and 75, respectively, and a rod 83 has one end pivoted to the gusset 82 while the other end of the rod is threaded and extends through a ring 84 carried by the gusset 82. A wing nut 85 is mounted on the threaded end of the rod 83 that extends through the ring 84 and the nut 85 may be rotated so as to bear against the ring and foreshorten the effective length of the rod to bring the end of the nozzle 77, down toward a horizontal plane. If the stream of water from the nozzle 77 is directed upward at an angle of 40° from the horizontal, the stream will reach about its maximum distance from the machine.

I provide a safety attachment for securing the pipe 75 to the pipe 73 in addition to the rubber hose 74. The pipe 73 has a pair of studs 86, one on each side of the pipe and likewise the pipe 75 has a pair of studs 87, one on each side. A flat bar 88 is provided for each side of the hose 74 and it has a slot 89 at one end for slidably receiving the stud 86 and it has an opening at its other end for receiving the stud 87. The purpose of the flat bars or straps 88 is to serve as a safety connection between the two pipes 73 and 75 while permitting a certain amount of movement between the two.

In FIGURES 1 and 3, I shown a rod 90 with one end welded to the pipe 75 and its outer end provided with a threaded bore for receiving a wing-type bolt 91. The bolt projects upwardly and it may be rotated so as to extend into the stream of pressured water as it leaves the nozzle 77 for causing great amounts of air to be sucked into the water stream to break it up into a mist of fine droplets. The water will fall on the ground in a gentle motion and will irrigate the finest and youngest growing crop without flattening or killing the plants.

I will now describe how the water pipe 71 is rotated back and forth in the swivel joint 70 for swinging the gun M, through a desired arc for irrigating a predetermined area. A large ring sprocket 92 is mounted on the pipe 71 and adjacent to the upper surface of the upper plate 63, see FIGURE 3. The plate 63 rotatably carries two idler sprockets 93—93 and a length of sprocket chain 94 is threaded around the three sprockets 93, 92 and 93, and has its ends connected to the ends of the reciprocable frame 67. It will be seen from this construction that a reciprocation of the frame 67 by the reciprocation of the rod 66 in the cylinder 65 will cause the sprocket chain 94 to rotate the pipe 71, which forms a part of the gun M, through a desired arc.

The hydraulic system for reciprocating the rod 66 and the frame 67 will now be described. In FIGURE 4, I show an enlarged isometric drawing of the hydraulically actuated valve N and also a pilot valve R that is controlled by a Y-shaped lever S. The valve N is mounted on the lower plate 61, see also FIGURE 3, and this figure further shows that the Y-shaped lever S is pivotally mounted at 95 on the valve R, which in turn is carried by two of the uprights 62. FIGURE 4 shows the pilot valve R mounted behind the plate 96 and the pivot 95 is a shaft extending into the pilot valve R for reversing the valve each time the Y-shaped lever S is swung to the right or to the left. The pilot valve R is illustrated in FIGURE 3 and it is shown diagrammatically in FIGURE 1. Also in FIGURE 1 the Y-shaped lever S is shown in a horizontal plane although in FIGURES 3 and 4 it is shown in a vertical plane. The pilot valve R is also made by the Calkins Manufacturing Co., Spokane, Wash., but other types could be used.

Before describing the water gun or nozzle and associate apparatus in detail, I had explained that the full flow control valve L was used to operate the hydraulic mechanism that swung the water gun M or nozzle 77 through the desired arc of a circle. The angle of opening of the valve arm 50 of the valve L controls the amount of fluid flowing through the line 53 and this in turn controls the speed of reciprocation of the frame 67 and the swinging of the water nozzle 77. The previous explanation had stated that the hydraulic line 53 had communicated with the T 54 in FIGURE 4. The oil will continue on into a hydraulic line 97 that leads to the pilot valve R.

FIGURE 3 shows the reciprocable frame 67 provided with a front bar 98, and this bar carries adjustable stops 99 and 100 that have depending portions positioned to alternately strike the Y-shaped lever S to reverse the movement of the frame at the end of each stroke. The stops can be positioned at any desired points along the front bar 98 so as to determine the length of reciprocable movement of the frame 67. The stops can be so arranged that the frame 67 will move the sprocket chain to rotate the large ring sprocket 92 to swing the nozzle 77 through an arc of 180° or any portion thereof so that the gun M will irrigate an area 90° on each side of the ditch of water or any portion thereof whether on both sides of the ditch or only on one side.

right, the speed control means for the left drive wheel will accelerate the rotation thereof and the speed control means for the right drive wheel will decelerate the rotation thereof for causing said machine to turn right to continue following the ditch course; and (g) means for sucking water from the ditch and for watering the area on both sides of the ditch.

2. The combination as set forth in claim 1: and in which (a) each of said power units is hydraulically operated;

(b) each of said speed control means includes a hydraulic valve for controlling the quantity of liquid delivered to each power unit for controlling the speed thereof and the speed of the drive wheel operatively connected thereto; and (c) said member is operatively connected to said valves for increasing the fluid flow through one valve and simultaneously decreasing the fluid flow through the other valve when said member is swung in one direction and vice versa;

(d) whereby said machine will automatically follow the course of the ditch.

3. The combination as set forth in claim 1: and in which (a) each hydraulic valve has associated therewith an associate valve whose control lever can be moved from neutral into forward or reverse positions;

(b) whereby either power unit can be individually controlled for causing its associate drive wheel to be rotated forwardly or rearwardly or remain idle.

4. The combination as set forth in claim 1: and in which (a) said watering means includes (b) a nozzle for distributing water over a wide area;

(c) means for oscillating said nozzle through an arc of about 180° so as to distribute water on both sides and to the rear of the machine; and (d) means for limiting the arc of the swing of said nozzle to any desired portion between the extreme limits of the arc.

5. In combination:

(a) a vertically extending water-conveying pipe;

(b) means for rotatably supporting said pipe;

(c) a sprocket gear mounted on said pipe;

(d) a reciprocable frame;

(e) a sprocket chain having its ends secured to the ends of said frame, said chain engaging with said sprocket so that a movement of said frame in one direction will rotate said pipe through an arc in one direction and a movement of said frame in the opposite direction will rotate said pipe through an arc in the opposite direction;

(f) a water nozzle connected by an elbow to said pipe for receiving water therefrom and distributing the water over an arc through which the rotating pipe oscillates said nozzle;

(g) means for delivering water under pressure to said pipe;

(h) means for reciprocating said frame;

(i) said water nozzle has a flexible section permitting the nozzle to be moved into different angular positions with respect to a horizontal plane;

(j) spring means for yieldingly urging said nozzle into making a greater angle with respect to said plane;

(k) adjustable means for determining the extent of the angle said nozzle makes with respect to said plane; and (l) a depending cable having its upper end connected to said nozzle and its lower end connected to a fixed support;

(m) whereby the oscillation of said nozzle through a predetermined arc will also cause said cable to vary the elevational angle continuously as said nozzle oscillates through the prescribed arc.

6. The combination as set forth in claim 5: and in which (a) the fixed support for the lower end of said cable comprises;

(b) a horizontal plate having an arcuate row of openings, the center of the row lying in a vertical plane that also has the axis of said water pipe lying therein; and (c) means for connecting the lower end of said cable to any desired one of the openings.

References Cited
UNITED STATES PATENTS

| | | | |
|---|---|---|---|
| 3,024,858 | 3/1962 | Davis | 180—6.48 |
| 3,047,236 | 7/1962 | Fahrner | 239—179 |
| 3,047,240 | 7/1962 | Lent | 239—264 X |
| 3,104,821 | 9/1963 | Anderson | 239—181 X |
| 3,106,247 | 10/1963 | Lacks | 239—264 X |
| 3,343,501 | 9/1967 | Banderet | 180—79.2 |

M. HENSON WOOD, Jr., Primary Examiner

RICHARD A. SCHACHER, Assistant Examiner

U.S. Cl. X.R.

104—244; 180—6; 239—225, 264